Patented Dec. 5, 1939

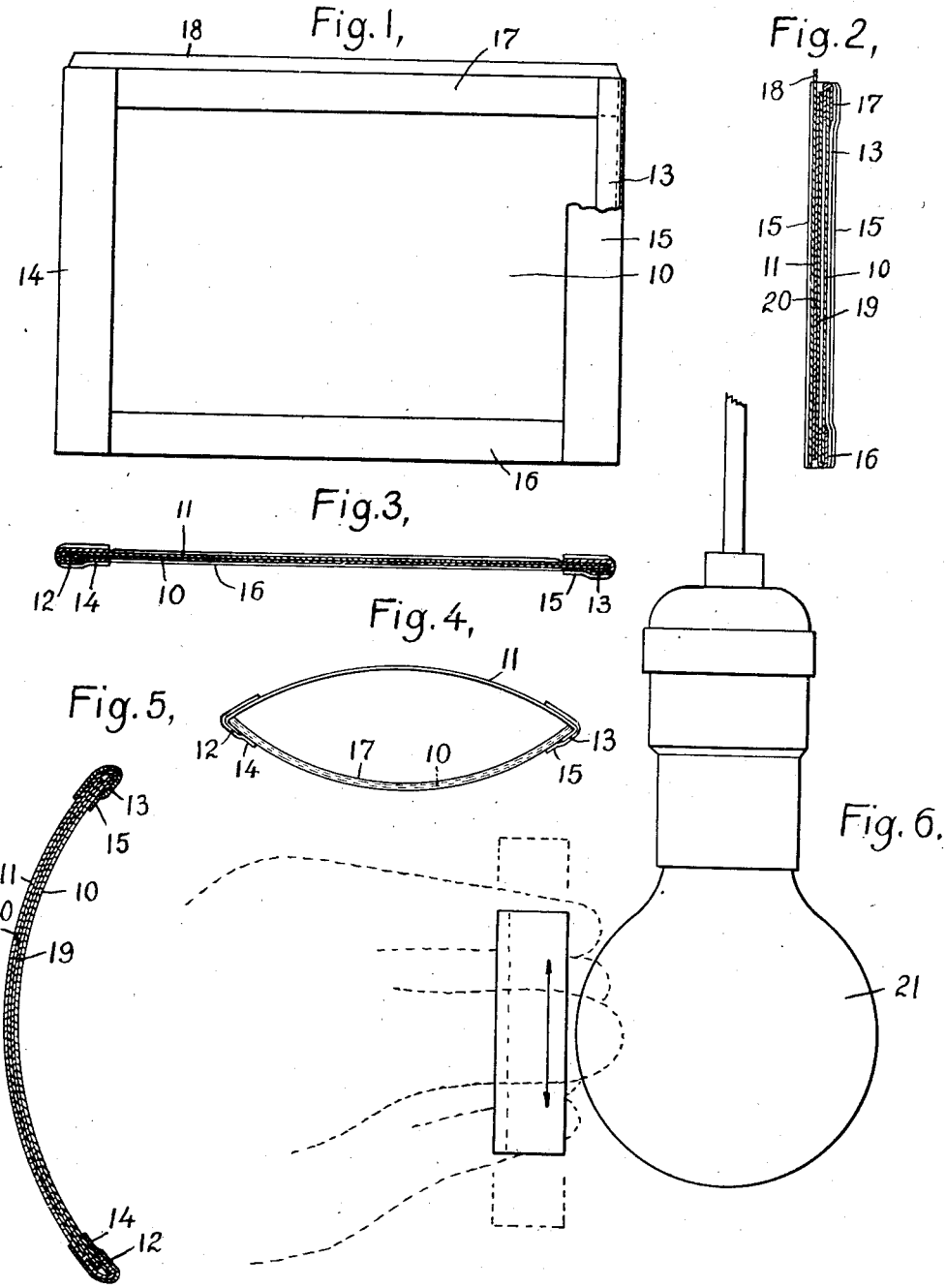

2,182,325

UNITED STATES PATENT OFFICE 2,182,325

PHOTOGRAPHIC PRINTING

Mayson H. Tucker, New York, N. Y.

Application September 28, 1938, Serial No. 232,045

5 Claims. (Cl. 95—77)

This invention relates to photographic printing and has for its principal object to provide an improved method and an improved apparatus for making contact photographic prints, especially prints in half-tones from picture negatives. The method and apparatus of the present invention are especially well suited for use in making photographic prints on paper requiring exposure to very bright light, such as the paper described and claimed in my copending application Serial No. 229,325, filed September 10, 1938.

In accordance with the method of the present invention, contact photographic prints, such as photographic prints in half-tones from picture negatives, are made by placing a suitable negative in contact with a suitable photographic printing paper coated with a photo-sensitive emulsion in a frame comprising a flexible, relatively incompressible, transparent facing and a flexible backing. The negative and paper are placed in the frame in a manner such that light may pass through the transparent facing of the frame and through the negative to the emulsion-coated surface of the paper. The frame with the negative and paper so placed therein is curved concavely toward the transparent facing, whereby the negative and paper are held tightly in surface contact, and the frame thus curved is held in close proximity to a source of light, with the transparent facing toward the source, for a suitable period of time to expose the paper. After the paper has been exposed, it is removed from the frame and the photographic image formed thereon is developed in any appropriate manner.

In carrying out the method of the invention, which is especially suited for use in printing on photographic paper requiring exposure to a very bright source of light (such as the paper described and claimed in my aforementioned application), the source of light for exposure of the paper conveniently may be a common 60-watt electric lamp of the so-called "Mazda" type. In making use of such a lamp, the frame with the negative and paper in place therein preferably is curved substantially concentrically with the bulb of the lamp, and the frame thus curved, while held in close proximity to the lamp, is moved back and forth before the lamp in a direction substantially normal to a radius of the curve of the frame, so as to secure uniform distribution of light over the exposed surface of the negative.

The new frame employed in practicing the above-described method of the invention comprises a facing of flexible, relatively incompressible, transparent sheet material, and a backing of flexible sheet material secured to said facing at at least two opposite points. The backing thus secured to the facing forms with the facing a pouch adapted to receive a photographic negative and a photographic printing paper, and the complete frame, as indicated above, is adapted to be curved with the negative and paper in place therein concavely toward the facing in a manner to hold the negative and paper tightly in surface contact.

The transparent facing of the new frame preferably is rectangular and preferably has substantially the same dimensions as the prints intended to be made in the frame. The backing also is preferably rectangular and of substantially the same dimensions as the facing, and advantageously is secured to the facing along at least two opposite edges. It is desirable to form borders of opaque material on the transparent facing about the edges thereof in order to produce suitable borders on the photographic prints made in the frame.

The invention will be better understood from the following description considered in conjunction with the accompanying drawing, in which—

Fig. 1 is a view of a preferred form of the new frame looking toward the facing;

Fig. 2 is a vertical cross-section through the new frame with a negative and printing paper in place;

Fig. 3 is a longitudinal cross-section through the new frame;

Fig. 4 is a view looking down on the new frame as distended for insertion of negative and paper;

Fig. 5 is a longitudinal cross-section through the new frame with negative and paper in place, as curved for exposure of the paper, and Fig. 6 illustrates a manner of employing the new frame.

The frame comprises a facing 10 of transparent, flexible, relatively incompressible sheet material such as a transparent sheet plastic. For example, clear, transparent sheet Celluloid, transparent cellulose acetate in sheet form, or other similar transparent sheet plastic material serves very well. Although the facing is flexible, it should be relatively incompressible and not too pliable, and for this reason it is preferred to employ sheet plastic material not substantially less in thickness than about 0.010 inch and advantageously about 0.020 inch in thickness for frames of average size (say about 3 x 5 inches). Generally speaking, the larger the frame, the greater should be the thickness of the facing. The facing preferably is rectangular and of substantially the same dimensions as the prints intended to be made.

A backing 11 of fabric or other flexible sheet material having generally the same dimensions (length and breadth) as the facing is aligned substantially in surface contact with the facing and is secured thereto along two of its opposite edges 12 and 13. As shown in the drawing, the opposite side edges 12 and 13 of the backing 11 are folded over the side edges of the facing 10 and are secured thereto by adhesive tapes 14 and 15. The adhesive tapes 14 and 15 adhere to and are folded over the edges 12 and 13 of the backing 11, and are brought forward and caused to adhere to the front or uncovered surface of the facing 10, thus securing the backing 11 to the facing 10.

Any suitable flexible sheet material may be employed for the backing, but in general a fabric such as muslin or linen, or a treated fabric such as oiled cloth or the like, is most satisfactory. An elastic backing such as thin sheet rubber or an elastic fabric may be used with advantage in some cases.

The adhesive tapes 14 and 15 may be of any suitable material. Adhesive fabric tapes may be employed, or non-adhesive fabric or other tapes may be used in conjunction with a suitable adhesive cement for securing the backing 11 to the facing 10. So-called Scotch tape is a very satisfactory adhesive tape for this purpose. If desired, the backing may be secured to the facing without the use of tapes by means of a film of a suitable adhesive cement interposed between the backing and the facing along two opposite edges thereof, but such construction is liable to be less sturdy than that shown in the drawing. Alternatively, the backing 11 may be secured to the facing by sewing the two together along opposite edges. Such construction is very sturdy but somewhat more expensive than that involving the use of adhesives. Or again, the backing may be clamped to the facing by a strip of metal bent over the edges of the backing and facing and crimped to hold the backing and facing tightly together at the edges.

The adhesive tapes 14 and 15 cover the side edges of the transparent facing 11 and preferably are substantially opaque so as to form side borders adapted to produce suitable side borders on prints of the size for which the frame is intended. For such borders it is desirable to employ as the tape a material such as paper, "Cellophane" (a tradename) Scotch tape, or the like, capable of being cut to provide a sharply defined edge, so as to avoid imparting fuzzy borders to prints made in the frame. Even when a fabric backing is sewn to the facing and tape is not necessary for mechanical strength, it is desirable to cover any overlap of the facing by the backing with a border of tape of this character, in order to form sharply defined borders on prints made in the frame.

In addition to the tapes 14 and 15 forming borders along the side edges of the facing, other opaque adhesive tapes 16 and 17 are applied along the upper and lower edges of the facing to form top and bottom borders. These tapes 16 and 17, like the side edge tapes 14 and 15, should be of material capable of being cut to provide sharply defined edges substantially free of objectionable fuzziness.

Instead of using tapes 14, 15, 16 and 17 to form borders about the edges of the transparent facing 10, suitable borders may be applied by a printing or painting operation using substantially opaque ink, paint or the like.

The facing 10 and backing 11 secured together substantially as described above form a pouch into which a suitable negative and a suitable photographic paper may be inserted preparatory to making a photographic print. Insertion of a negative and a paper of proper size in the frame so formed may readily be accomplished, for example, by bending the flexible facing 10 convexly toward its front or uncovered surface (Fig. 4), whereby the backing 11 may be released from its normal position in substantial surface contact with the facing and the frame thus may be distended. Insertion of the negative and paper is facilitated by providing that an edge 18 of the backing that is not secured to the facing projects slightly beyond the corresponding edge of the facing. The projecting edge 18 of the backing forms a convenient guide for the negative and paper being inserted into the frame, and a convenient grip for distending the frame to the position shown in Fig. 4.

In using the frame to print on a paper coated with an emulsion requiring exposure to a very bright light (such as the paper described in my aforementioned application), a suitable negative 19 is inserted in the frame adjacent the transparent facing 10 and a suitable photographic printing paper 20 is inserted adjacent the backing 11 between the backing and the negative, with the emulsion-coated surface of the paper toward the negative. Thus light transmitted through the transparent facing passes through the negative to the photo-sensitive emulsion on the paper.

The frame with the negative and paper in place is then curved concavely toward the transparent facing. By this operation the backing 11, being secured to the side edges of the facing 10, is drawn toward the convex rear surface of the facing and presses the paper tightly into surface contact with the negative, with the negative pressed tightly against the facing. The frame held thus curved (advantageously by hand) may then be brought in close proximity to the bulb 21 of a lighted electric lamp, such as a common 60-watt lamp of the so-called "Mazda" type. The frame with the negative and paper in place may be held in this manner within a fraction of inch of the light bulb, where the light intensity may be of the order of 500 foot-candles, and preferably it is curved, while thus held, to such a degree as to be substantially concentric with the curvature of the lamp bulb. The frame is then moved back and forth before the lamp bulb in a direction substantially normal to a radius of the curve of the frame, as indicated by the arrow and dotted lines in Fig. 6. With proper curvature of the frame and proper back and forth motion of the frame before the lamp, uniform distribution of light over the surface of the negative is readily secured and the production of a well-exposed print is easily achieved.

After exposure before the lamp for a suitable period of time, the paper is withdrawn from the frame and developed in any suitable manner.

Although the above-described manner of using the new frame in accordance with the method of the invention ordinarily is preferred, it is understood that the frame described above may be used with advantage in other ways as well.

I claim:

1. A contact photographic printing frame adapted for use in making half-tone photographic prints from a suitable negative comprising a facing of flexible, relatively incompressible, transparent sheet material, and a backing of flexible sheet material secured to said facing, said backing forming with the facing a pouch adapted to receive a photographic negative and a photographic printing paper, said backing being at least slightly elastically extensible, whereby the frame may be concaved to varying extents toward the facing in a manner to hold a negative and paper in the frame tightly in surface contact without wrinkling of the frame, and said frame being of such size and flexibility as to adapt it to be held in and curved by the hand with the negative and paper in place therein concavely toward the facing in a manner to hold the negative and paper tightly in surface contact, said frame when in use being free of light obstructing appurtenances before the transparent facing thereof.

2. A contact photographic printing frame adapted for use in making half-tone photographic prints from a suitable negative on a paper requiring exposure to a very bright light comprising a rectangular facing of flexible, relatively incompressible, transparent sheet material, and a rectangular backing of flexible sheet material having substantially the same dimensions as the facing aligned substantially in surface contact with said facing and secured thereto along at least two opposite edges, said backing forming with the facing a pouch adapted to receive a photographic negative and a photographic printing paper, said backing being at least slightly elastically extensible, whereby the frame may be concaved to varying extents toward the facing in a manner to hold a negative and paper in the frame tightly in surface contact without wrinkling of the frame, and said frame being of such size and flexibility as to adapt it to be held in and curved by the hand with the negative and paper in place therein concavely toward the facing in a manner to hold the negative and paper tightly in surface contact, said frame when in use being free of light obstructing appurtenances before the transparent facing thereof.

3. A contact photographic printing frame adapted for use in making half-tone photographic prints from a suitable negative on a paper requiring exposure to a very bright light comprising a facing of flexible, relatively incompressible, transparent sheet material, a backing of flexible sheet material having substantially the same dimensions as the facing aligned substantially in surface contact with said facing and secured thereto, said backing forming with said facing a pouch adapted to receive a photographic negative and a photographic printing paper, said backing being at least slightly elastically extensible, whereby the frame may be concaved to varying extents toward the facing in a manner to hold a negative and paper in the frame tightly in surface contact without wringling of the frame, and substantially opaque borders formed at the edges of the transparent facing and adapted to produce borders on photographic prints made in the frame, said frame being of such size and flexibility as to adapt it to be held in and curved by the hand with the negative and paper in place therein concavely toward the facing in a manner to hold the negative and paper tightly in surface contact, said frame when in use being free of light obstructing appurtenances before the transparent facing thereof.

4. A contact photographic printing frame adapted for use in making half-tone photographic prints from a suitable negative on a paper requiring exposure to a very bright light comprising a facing of flexible, relatively incompressible, transparent plastic sheet material having substantially the dimensions of the prints intended to be made, a flexible backing of substantially the same dimensions as the facing aligned substantially in surface contact with said facing and secured thereto at at least two opposite points, said backing forming with said facing a pouch adapted to receive a photographic negative and a photographic printing paper, said backing being at least slightly elastically extensible, whereby the frame may be concaved to varying extents toward the facing in a manner to hold a negative and paper in the frame tightly in surface contact without wrinkling of the frame, and borders of substantially opaque sheet material mounted about the edges of the transparent facing and adapted to produce borders on photographic prints made in the frame, said frame being of such size and flexibility as to adapt it to be held in and curved by the hand with the negative and paper in place therein concavely toward the facing in a manner to hold the negative and paper tightly in surface contact, said frame when in use being free of light obstructing appurtenances before the transparent facing thereof.

5. A contact photographic printing frame adapted for use in making half-tone photographic prints from a suitable negative on a paper requiring exposure to a very bright light comprises a rectangular facing of flexible, relatively incompressible, transparent sheet material, a rectangular backing of flexible sheet material having substantially the same dimensions as the facing aligned substantially in surface contact with said facing, and metal strips bent over and crimped against adjacent edges of the facing and backing along two opposite sides of the frame in a manner firmly to secure the facing to the backing along said edges, said backing forming with the facing a pouch adapted to receive a photographic negative and a photographic printing paper, said backing being at least slightly elastically extensible whereby the frame may be concaved to varying extents toward the facing in a manner to hold a negative and paper in the frame tightly in surface contact without wrinkling of the frame, said frame being of such size and flexibility as to adapt it to be held in and curved by the hand with the negative and paper in place therein concavely toward the facing in a manner to hold the negative and paper tightly in surface contact, and said frame when in use being free of light obstructing appurtenances before the transparent facing thereof.

MAYSON H. TUCKER.